United States Patent [19]
Rees

[11] Patent Number: 5,398,904
[45] Date of Patent: Mar. 21, 1995

[54] GEAR REDUCER

[75] Inventor: Richard W. A. Rees, Rochester Hills, Mich.

[73] Assignee: ITT Corporation, New York, N.Y.

[21] Appl. No.: 40,634

[22] Filed: Mar. 31, 1993

[51] Int. Cl.⁶ ............................................. F16M 13/00
[52] U.S. Cl. ................................... 248/429; 475/162
[58] Field of Search ................ 248/429; 475/162, 176

[56] References Cited

U.S. PATENT DOCUMENTS

| | | |
|---|---|---|
| 4,332,418 | 6/1982 | Strowik . |
| 5,209,637 | 5/1993 | Reubeuze ........................ 475/162 X |
| 5,224,749 | 7/1993 | Gauger et al. .................. 248/429 X |

FOREIGN PATENT DOCUMENTS

| | | | |
|---|---|---|---|
| 711700 | 9/1931 | France .................. 475/176 |
| 1165352 | 10/1958 | France .................. 475/176 |
| 480963 | 3/1938 | United Kingdom ................ 475/162 |

*Primary Examiner*—Blair M. Johnson
*Attorney, Agent, or Firm*—Robert P. Seitter; J. Gordon Lewis

[57] ABSTRACT

A gear reducer includes a first non-rotatable gear. A second transfer gear formed of a resilient material engages the first gear. The second gear is eccentrically driven about the first gear by an eccentric collar mounted in the second gear and coupled to a motor output shaft. The second transfer gear nutatingly engages a rotatable third gear and moves one tooth of the third gear into alignment with one tooth of the first gear for each predetermined amount of rotation of the second transfer gear. A rotatable driven shaft is coupled to and rotated by the third gear. The first and third gears each have a plurality of gear teeth arranged at the same pitch circle diameter; but provided in a different number of teeth on each of the first and third gears to provide a selective reduction between the speed of rotation of the motor output shaft and the speed of rotation of the driven shaft coupled to the third gear.

17 Claims, 6 Drawing Sheets

GEAR REDUCER

BACKGROUND OF THE INVENTION

1. Field of the Invention

The present invention relates, in general, to gear reduction devices and, more specifically, to power seat adjusters for vehicle seats employing gear reduction devices.

2. Description of the Art

Gear reducers or gear reduction units are employed with rotating devices, such as motor output shafts, lead screws, drive shafts, etc., to reduce the speed of rotation of one shaft or element to a lower speed of rotation of a coupled or driven element. Gear reducers are available in a variety of configurations and provide gear reductions of between 1:2 to 1:1000 and more.

One application of gear reducers is in a power seat adjuster for a vehicle seat which provides for selective fore and aft, up and down and/or seat back reclining features. A typical power seat adjuster carries an upper support frame or support members which engage and support the seat bottom of a vehicle seat. The upper support members are mounted on first and second, spaced track assemblies, each formed of an upper track which is connected to the upper support frame and slidably mounted in a lower track fixedly anchored to the vehicle floor. A drive mechanism, typically formed of a bi-directional electric motor mounted on the power seat adjuster, rotates a pair of shafts extending outward from the motor to a gear assembly or gear box mounted on each upper track. Each gear box includes a gear reducer unit to reduce the high speed of rotation of the shaft to a lower speed of rotation of a lead screw which is coupled to each upper track and which is rotatively driven by the gear box.

While such a power seat adjuster provides smooth selective positioning of a vehicle seat, it is well known that a considerable amount of noise is generated in a typical power seat adjuster due to the high speed of rotation of the shafts, particularly when a flexible shaft is employed. One drive motor used for horizontal fore and aft positioning of the seat is typically mounted between the spaced track assemblies with flexible shafts extending outward from opposite sides of the motor to the gear boxes mounted on the track assemblies. Both shafts rotate at the same time thereby doubling the noise generated by rotation of such shafts.

Thus, it would also be desirable to provide a gear reducer which has multiple numbers of gear teeth in engagement at any one time so as to provide a desired amount of torque while enabling the use of low strength, low cost materials for such gears. It would also be desirable to provide a gear reducer which is quiet in operation. It would also be desirable to provide a gear reducer which prevents any back drive. It would also be desirable to provide a gear reducer which reduces the noise generated by rotation of a drive shaft when the gear reducer is employed in a vehicle power seat adjuster. Finally, it would also be desirable to provide a gear reducer which may be directly connected to or integrally formed with an electric drive motor so as to reduce the size of the mechanical components of a vehicle power seat adjuster.

SUMMARY OF THE INVENTION

The present invention is a gear reducer for reducing the speed of rotation of a drive shaft to a lesser speed of rotation of a driven shaft, in which both the drive shaft and the driven shaft are connected as an input and an output, respectively, to the gear reducer.

In one embodiment, the gear reducer includes a first non-rotatable gear. A second transfer gear meshingly engages the first gear and is formed of a resilient material. Means, connected to a drive shaft, are provided for eccentrically driving the second gear in meshing engagement around the first gear. A third gear is rotatably mounted with respect to the first and second gears. The second gear nutates about the third gear and moves one tooth of the third gear into alignment with one tooth of the first gear for each predetermined amount of rotation of the second gear. An output shaft connection means is formed on the third gear for connecting an output or driven shaft to the third gear. The first and third gears each have a plurality of gear teeth formed thereon. The gear teeth on each of the first and third gears are disposed at the same pitch circle diameter, but are provided in different numbers on the first and third gears such that eccentric rotation of the second gear about the first gear causes the second gear to nutate and engage the third gear to bring teeth of the first and third gears into successive alignment upon each predetermined amount of rotation of the second gear to cause a reduced speed of rotation of the third gear with respect to the speed of rotation of the drive shaft input to the gear reducer.

In one embodiment, a first diameter bore is formed in a housing. The first gear is integrally formed in the housing internally within the first diameter bore. A second diameter bore is formed in the housing adjacent to and opening to the first diameter bore. An output member is freely rotatably mounted in the second diameter bore in the housing and has first and second opposed ends. A bore is formed in the first end of the output member. The third gear is formed internally in the bore in the output member and is substantially coaxial with the first gear. The output shaft connection means is formed on the second end of the output member and is preferably in the form of a tubular sleeve extending outward from the housing and having an internal bore for receiving a driven shaft.

In one embodiment, the third gear has one more tooth than the number of teeth on the first gear. In another embodiment, the third gear has two more teeth than the number of teeth on the first gear. In this manner, if the first gear has thirty teeth, by way of example only, in the one tooth difference embodiment, the output member is driven at a ratio of 1:30 of the speed of rotation of the drive shaft connected to the second gear. In the two tooth difference embodiment, the output member is driven at a ratio of 1:15 of the speed of rotation of the second gear.

The eccentrically driving means preferably comprises a rotatable drive shaft connected to a source of rotation, such as a bi-directional electric motor. A collar has a first bore eccentrically located with respect to the axis of rotation of the collar and receives the rotatable drive shaft of the motor. The collar is mounted in a running fit within the second gear.

In another embodiment, an end bell is mounted on a motor and has a through bore receiving the drive shaft of the motor therethrough. The first gear is integrally formed on the end bell and has a plurality of radially inward extending gear teeth. A housing having a hollow interior cavity and a through bore extending through one side wall is fixedly connected to the end bell of the motor and surrounds the first, second and third gears. The output shaft connection means on the output member rotatably extends through the bore in the sidewall of the housing for receiving a driven shaft therein.

The above-described gear reducer of the present invention may be advantageously employed in a power seat adjuster for a vehicle seat. In this application, the gear reducer may be mounted on or integrally formed on one or more of the drive motors typically employed in a power seat adjuster, such as the horizontal fore and aft drive motor which has a pair of oppositely extending output shafts. A gear reducer is connected to each output shaft of the motor and receives one end of a rotatable shaft therein. The other end of each rotatable shaft is connected to the drive means or lead screw on the upper track of each track assembly of the power seat adjuster.

In this arrangement, the gear reducer of the present invention reduces the speed of rotation of the rotatable shaft to a lesser amount, such as 1/15th, 1/30th, etc., of the rotation of the output shaft of the motor. Such rotation reduction directly occurs at the location of the motor such that the entire rotatable shaft rotates at a much lower speed than in previously devised power seat adjusters where such gear reduction takes place at the lead screw mounted in each track assembly. This arrangement significantly reduces the noise generated by high speed rotation of the rotatable shafts, particularly when flexible drive shafts are employed in previously devised power seat adjusters since the gear reducer reduces the speed of rotation of the drive shaft directly at the motor and not at the location of the lead screw mounted on each of the pair of spaced track assemblies. An additional advantage of using the gear reduction apparatus of the present invention in a vehicle power seat adjuster is that the size and the number of components of the gear mechanism connecting the rotatable shaft to the lead screw can be simplified at the location of the lead screw. This reduces the space requirements of each track assembly and thereby enables the design of the track assembly to be reduced and designed with a smaller overall size.

Further, the gears in the gear reducer have a sinusoidal form which better permits sliding contact during engagement of the various gear teeth of such gears. This generates high amounts of friction which prevents any back drive of the gear reducer. In addition, the flexible nature of the second transfer gear enables multiple numbers of gear teeth to be in engagement at any one time. This enables the gear reducer to be formed of low strength, low cost material, such as plastic, which also reduces the noise generated by the gear reducer itself.

BRIEF DESCRIPTION OF THE DRAWING

The various features, advantages and other uses of the present invention will become more apparent by referring to the following detailed description and drawings in which.

DESCRIPTION OF THE PREFERRED EMBODIMENTS

The present invention is a gear reducer or gear reduction apparatus which reduces the speed of rotation of a drive shaft input thereto to a much slower speed of rotation of an output or driven shaft also connected thereto. First, a general description of the construction and operation of the gear reducer of the present invention will be provided followed by an exemplary application of the gear reducer in a vehicle power seat adjuster.

Referring now to FIGS. 1–4, there is depicted a first embodiment of a gear reducer 10. The gear reducer 10 is depicted by way of example only with a drive motor 12, which, in an exemplary embodiment, may comprise a bi-directional electric drive motor having a rotatable output shaft. The motor 12 includes a conventional end bell 14 in a form of a generally rectangular member extending from one side of the casing of the motor 12. An internal bore 16 is formed in the end bell 14 and typically has a square cross section for receiving a coupler shaft 18, such as a square cross section rod, therein which is rotated by the output shaft of the motor 12. The coupler shaft 18 may be a separate member mounted in the bore 16 or may be integrally formed as part of the output shaft of the motor 12.

Figure 1:
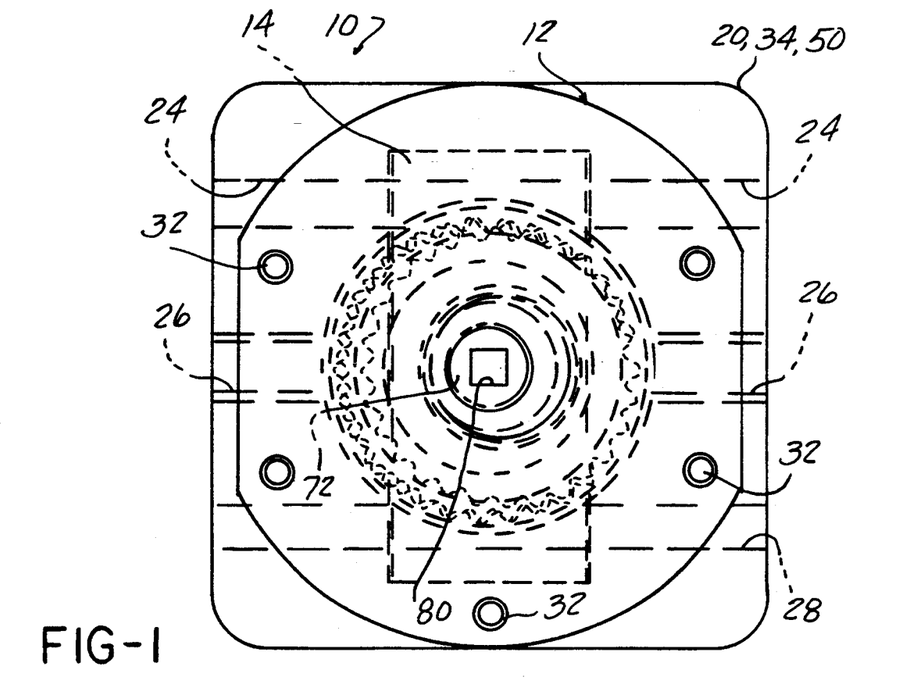
FIG. 1 is a front elevational view of a gear reducer constructed in accordance with first embodiment of the teachings of the present invention.

The gear reducer 10 includes, in a first embodiment, an adapter plate 20 having a generally square shape as shown in FIG. 1. A rectangular shaped bore 22 is centrally formed in the adapter plate 20 and receives the end bell 14 of the drive motor 12 therein. The adapter plate 20 is formed of a plastic material and has a plurality of transverse extending bores 24 and 28 which are alignable with mating bores 24' and 28' formed in the end bell 14 of the drive motor 12. Suitable fasteners, not shown, are mounted in the aligned bores 24 and 24', and 28 and 28' to securely attach the adapter plate 20 on the end bell 14. A pair of centrally located, transverse bores 26 are formed in the adapter plate 20 between the bores 24 and 28. The bores 26 receive suitable mounting pins, not shown, to mount the gear reducer 10 and motor 12 to a support, such as a seat adjuster frame. A plurality of peripherally arranged threaded bores, all denoted by reference number 30, receive threaded fasteners 32 to secure a housing 34 to the adapter plate 20.

Figure 3:
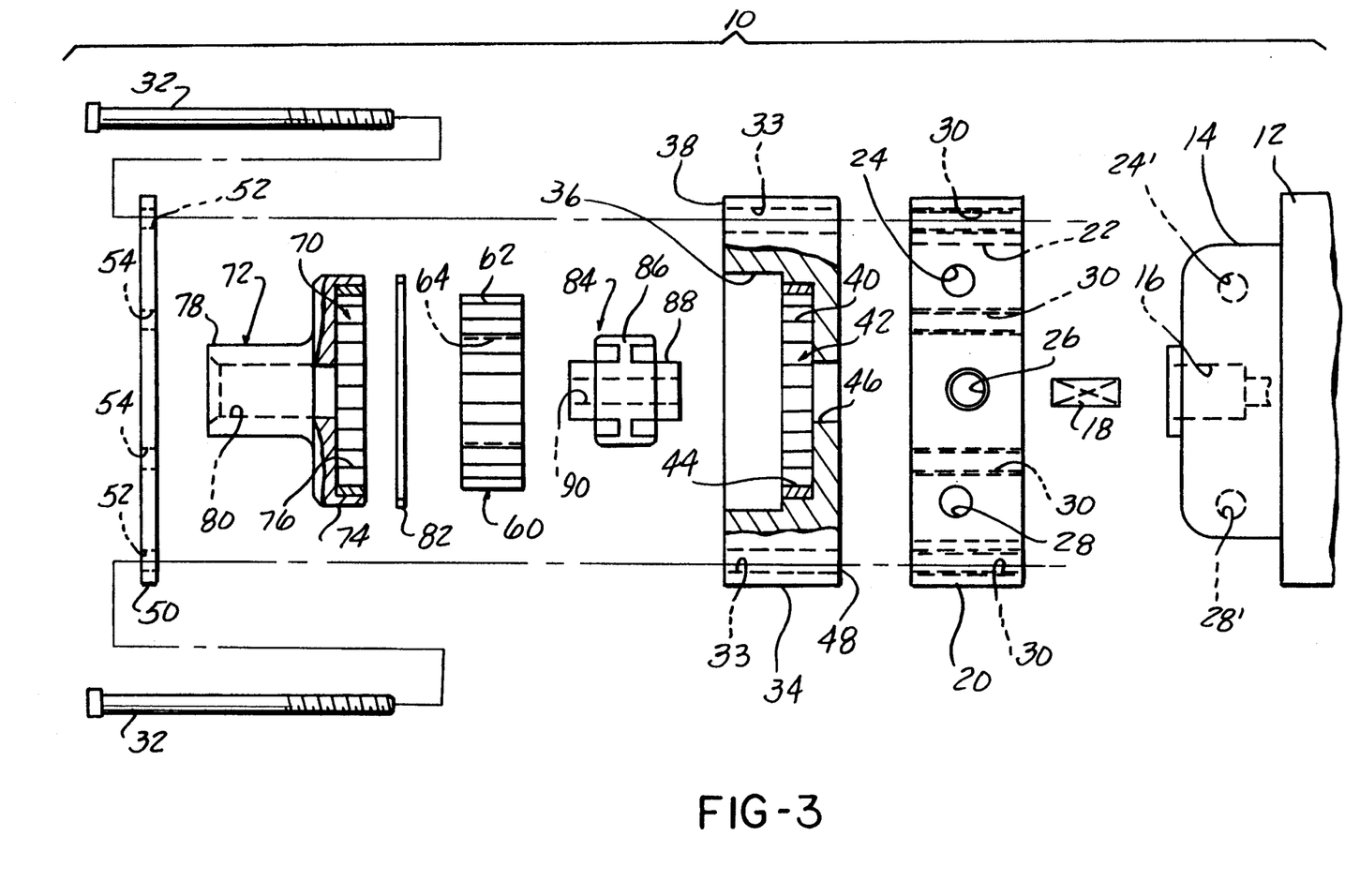
FIG. 3 is an exploded, partially cross-sectioned, side elevational view depicting the individual components of the gear reducer shown in FIGS. 1 and 2.

The housing 34 is also formed of a suitable plastic material and generally has the same size and square shape as the adapter plate 20. Peripheral bores 33 are formed in the housing 34 to receive the fasteners 32 therethrough. The bores 33 are alignable with the bores 30 in the adapter plate 20.

The housing 34 is provided with a first diameter internal bore 36 which opens to a first end 38 of the housing 34. A second internal bore 40 is formed in the housing 34 immediately adjacent to and in communication with the first diameter bore 36. A first gear means 42 having a plurality of radially inward extending gear teeth 44 is formed in the inner surface of the second diameter bore 40. A third diameter bore 46 is also formed in the housing 34 and opens to a second end 48 of the housing 34. The third bore 46 is smaller in diameter than the second diameter bore 40 and opens to the second diameter bore 40.

An end plate 50 is mounted over the first end 38 of the housing 34 to cover the first diameter bore 36 formed therein. The end plate 50 has a plurality of peripherally spaced bores 52 which are alignable with the bores 33 in the housing 34 and receive the threaded fasteners 32 therethrough to attach the end plate 50 and the housing 34 to the adapter plate 20. A small centrally located bore 54 is formed in the end plate 50, the purpose of which will be described in greater detail hereafter.

A second transfer gear 60 has a plurality of radially outward extending, circumferentially spaced gear teeth 62 formed thereon. A central bore 64 extends through the second transfer gear 60 for receiving an eccentric collar described hereafter. The second transfer gear 60 is provided in a sufficient thickness or width so as to meshingly engage the gear teeth 44 on the first gear 42 in the housing 34 as well as a third gear 70 formed on an output or driven member 72. The second transfer gear 60 is rotatably mounted within the housing 34, with a first end portion disposed within the second diameter bore 40 and an opposite or second end portion disposed in the first diameter bore 36 in the housing 34, as shown in FIG. 2.

The output member 72 has an enlarged first end portion 74 which is freely rotatably mounted within the first diameter bore 36 of the housing 34. The third gear 70, which is also formed of a suitable plastic material, has a plurality of radially inward extending gear teeth 76 formed internally within the first end portion 74 of the driven member 72. A smaller diameter shaft 78 extends from the first end portion 74 and has an internal bore 80 formed therein. The bore 80 acts as a drive shaft connecting means for receiving a rotatable shaft which is rotated or driven by the output member 72 as described hereafter.

The second transfer gear 60 is eccentrically driven into engagement with the second gear 42 by means of an eccentric driving means in the form of a collar 84. The collar 84 has an enlarged central portion 86 which is mounted in a running fit into the central bore 64 in the second transfer gear 60. A smaller diameter sleeve 88 extends outward from opposite ends of the central collar 86. A through bore 90 having a square cross section extends through the sleeve 88 and receives the coupler shaft 18 at one end for connecting the eccentric collar 84 to the rotatable output shaft of the drive motor 12.

Figure 2:
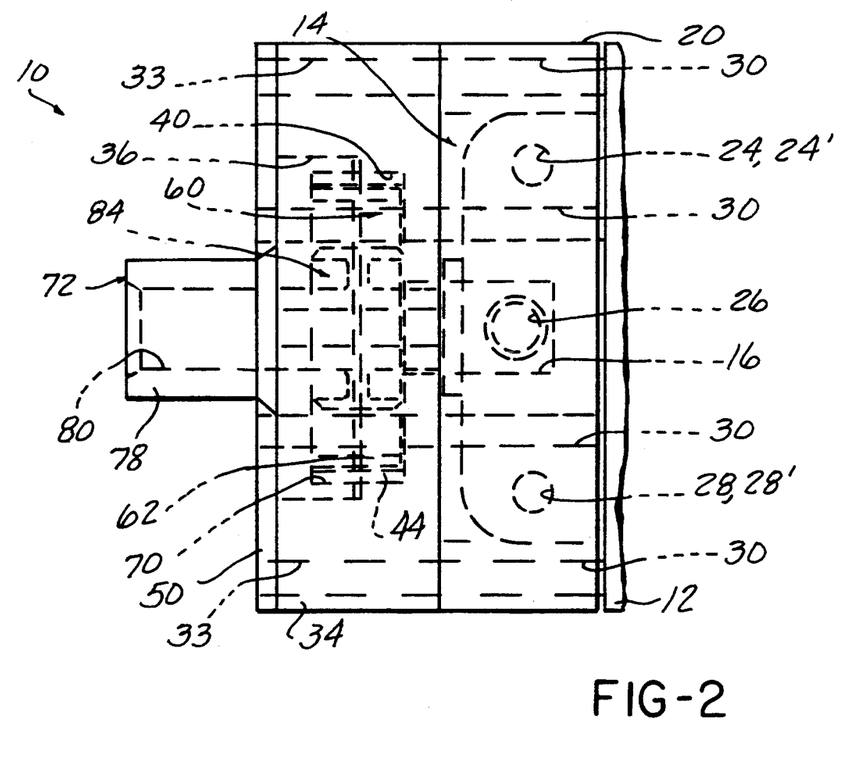
FIG. 2 is a side elevational view of the gear reducer shown FIG. 1.

When the second transfer gear 60, the output member 72 and the eccentric collar 84 are mounted within the housing 34, as shown in FIG. 2, the second transfer gear 60 will span the second gear 42 and the third gear 70.

A thin, substantially circular bearing 82 is mounted between the peripheral ends of the output member 72 and an internal shoulder formed in the housing 34 between the first diameter bore 36 and the second diameter bore 40. The bearing 82 has a central aperture formed therein for receiving the second transfer gear 60 therethrough.

Figure 5:
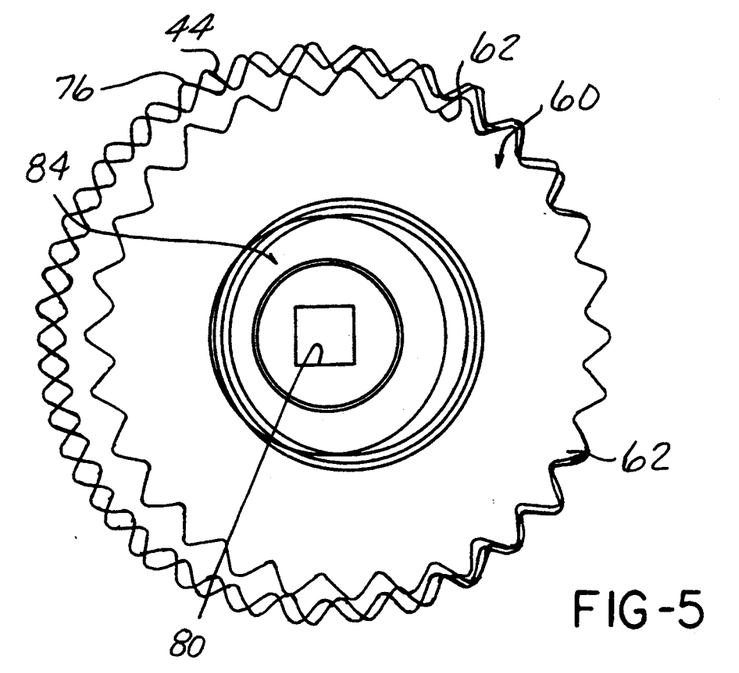
FIG. 5 is a pictorial diagram showing the meshing engagement of the first, second and third gears employed in one embodiment of the gear reducer shown in FIG. 3.

In a preferred embodiment, the second transfer gear 60 is formed of a resilient material, such as urethane or other similar polymeric material, so as to exhibit some degree of elasticity to bring one gear tooth 76 on the third gear 70 into alignment with one gear tooth on the first gear 42, with a single gear tooth 62 on the second transfer gear 60 spanning the aligned spaces between adjacent teeth on the first and third gears 42 and 70, as shown in FIG. 5.

FIG. 5 pictorially illustrates that the second transfer gear 60 has a smaller diameter and a smaller number of teeth than either of the first and third gears 42 and 70, respectively. The gear teeth 44 on the first gear 42 and the gear teeth 76 on the third gear 70 have the same shape and the same pitch circle diameter, but are provided in different numbers on the respective first and third gears 42 and 70. In FIG. 5, by way of example only, the first gear 42 is provided with thirty teeth. The third gear 70 is provided with gear teeth 76 which differ in total number from the number of gear teeth on the first gear 42 by a predetermined number of teeth, such as a single tooth.

In operation, energization of the drive motor 12 will cause the drive motor 12 to rotate its output drive shaft and the attached coupler shaft 18 and the eccentric collar 84 at a predetermined, high speed of rotation. This high speed, eccentric rotation of the collar 84 causes the second transfer gear 60 to move about the first gear 42 and advance a predetermined angular amount about the first gear 42 for each complete 360° rotation of the collar 84. The second transfer gear 60 is thus driven through an eccentric path as shown in FIG. 5 about the fixed, non-rotatable first gear 42. During such movement, the second transfer gear 60 nutates, i.e., moves with a small vibratory movement about a central axis of the third gear 70, moves one tooth 76 on the third gear 70 into alignment with one tooth 44 on the first gear 42, as shown in FIG. 5 at a three o'clock position, for each 360° rotation of the collar 84 and motor output shaft where a one tooth difference exists between the number of teeth on the first and third gears 42 and 70. A number of gear teeth on adjacent sides from the aligned gear teeth are also in partial or substantially full engagement at this time as shown in FIG. 5. In this manner, it will take thirty revolutions of the motor output shaft and collar 84 to enable the second transfer gear 60 to rotate the third gear 70 and the output member 72 one 360° revolution thereby providing a gear reduction of 30:1 for a one tooth difference between the number of teeth on the first and third gears 42 and 70, where the first gear 43 has 30 teeth.

Figure 6:
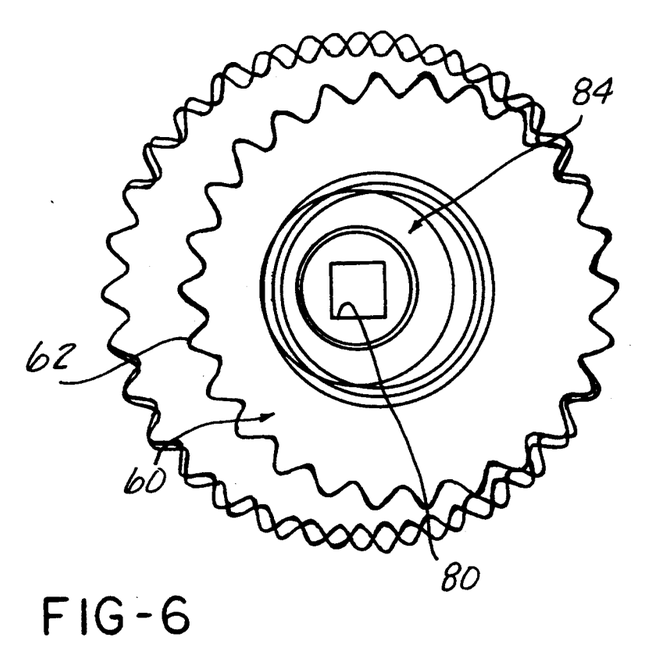
FIG. 6 is a pictorial diagram of the meshing engagement of the first, second and third gears in another embodiment of the gear reducer shown in FIG. 3.

FIG. 6 depicts another embodiment in which a two tooth difference is provided between the number of teeth on the first gear 42 and the number of teeth on the third gear 70. In this example, the first gear 42 is provided with thirty teeth, while the third gear 70 has thirty-two teeth. The operation of the embodiment shown in FIG. 6 is identical to that depicted in FIG. 5 except that the two tooth difference between the number of teeth on the first and third gears 42 and 70 causes a reduction of 15:1. In this embodiment, during each complete 360° rotation of the motor output shaft and the collar 84 the second transfer gear 60 brings two separate teeth on the third gear 70 into alignment with teeth on the first gear 42. It should be noted that the single tooth difference embodiment shown in FIG. 5 may also provide a gear reduction of 15:1 by use of a different number of teeth on the first and third gears 42 and 70, such as 15/16 or 14/15, respectively.

It is important that the second transfer gear 60 be formed of a resilient material, such as urethane, since the second transfer gear 60 forces the teeth of the first and third gears 42 and 70, which have different total numbers of teeth, into alignment. Since all of the first, second and third gears 42, 60 and 70, respectively, have different pitches, there is some interference between the aligned teeth of the first, second and third gears 42, 60 and 70. However, the resilient nature of the second transfer gear 60 overcomes such interference and enables the gears to freely rotate.

Figure 4:
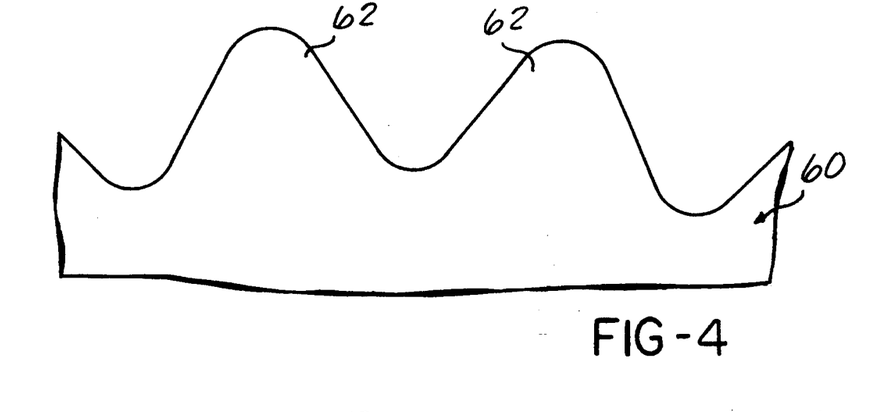
FIG. 4 is a partial, enlarged view showing the shape of the gear teeth on the various gears employed in the gear reducer of the present invention.

The gear teeth on each of the first, second and third gears 42, 60 and 70 have a shape as shown in FIG. 4 which depicts the shape of the gear teeth 62 on the second transfer gear 60. The gear teeth 62 have a simple harmonic or sinusoidal shape in which there is no difference between the addendum and dedendum distance from the pitch circle diameter of each tooth 62. A similar gear form or shape is also provided on the first and third gears 42 and 70. A sinusoidal shape is preferred since it better permits sliding contact between the teeth 62 on the second transfer gear 60 and the teeth on the first and third gears 42 and 70 as compared to an involute form which is more suited to conventional rolling contact. Further, the sinusoidal shape can be provided in either spur or helical tooth forms. The sinusoidal shaped gear teeth are ideal for high speed, low torque applications such as in a vehicle seat adjuster.

The second transfer gear 62 may also be eccentrically driven by means of a suitably shaped collar, similar to collar 84, but having an oval shape with a non-centrally located drive shaft connection bore. Such a collar, due to the flexible nature of the second transfer gear 62 will force the second transfer gear 62 into an oval shape when mounted therein. A thusly formed oval shaped second transfer gear will also nutate about the third gear 70 and, at the same time, cause multiple numbers of gear teeth 62 to engage gear teeth on the first and third gears 42 and 70 at any one time.

Figures 7, 8, 10:
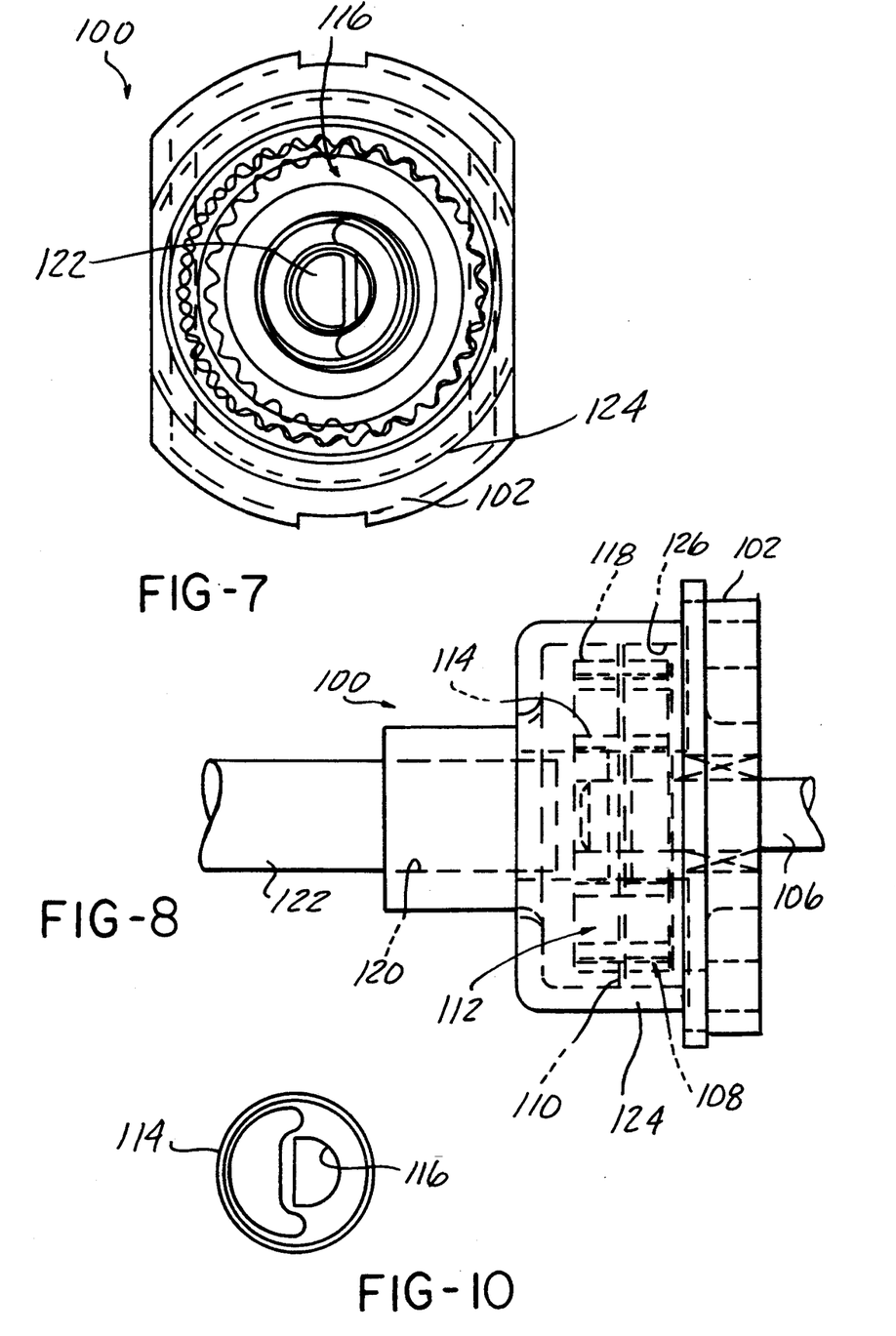
FIG. 7 is a front elevational view of a second embodiment of a gear reducer according to the teachings of the present invention.
FIG. 8 is a side elevational view of the gear reducer shown FIG. 7.
FIG. 10 is an end view of the eccentric collar shown FIGS. 8 and 9.
Figure 9:
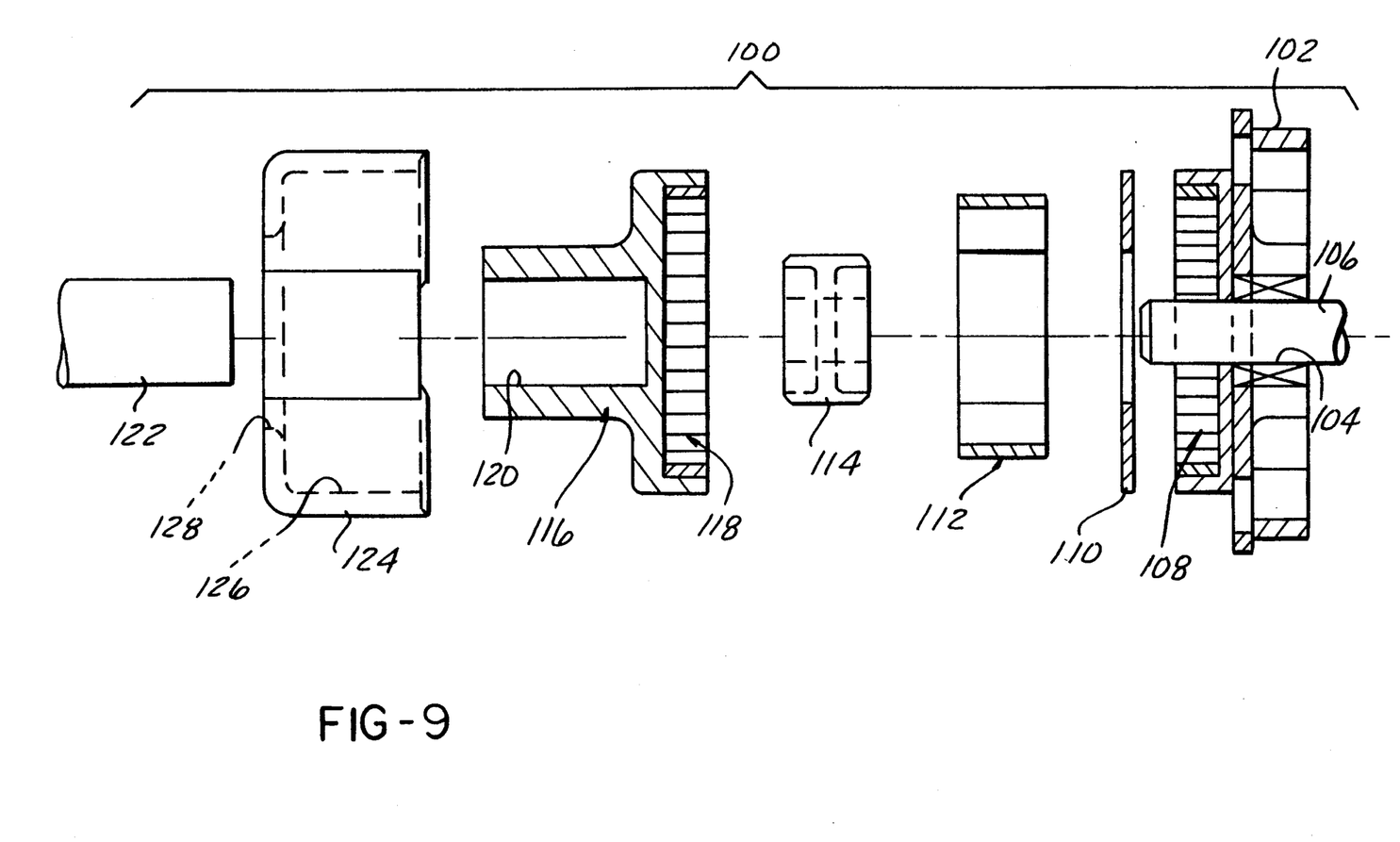
FIG. 9 is an exploded, partially cross-sectioned, side elevational view of the gear reducer shown in FIG. 8.

Another embodiment of the gear reducer of the present invention is shown in FIGS. 7-10. In this embodiment, a gear reducer 100 is formed as an integral part of a drive motor 12. As shown in FIGS. 8 and 9, the gear reducer 10 includes an end bell 102 which is formed as an integral part of the drive motor 12. The end bell 102 has a central bore 104 through which the drive shaft 106 of the drive motor extends. A first gear 108 having a plurality of inwardly extending gear teeth is formed at one end of the end bell 102. A bearing 110 is disposed adjacent to the outer end of one end portion of the end bell 102. A second transfer gear 112 having a plurality of outward radially extending teeth meshingly engages the first gear 108. The second transfer gear 112 is eccentrically driven by means of an eccentric collar 114 having an offset central bore 116 preferably having a D-shape for receiving one end of the drive shaft 106 therein. The eccentric collar 114 is disposed in a running fit in a central bore in the second transfer gear 112 for eccentrically driving the second transfer gear 112 about the first gear 108. A rotatable output member 116 has a third gear 118 formed at one end thereof. The third gear 118 is formed of a plurality of radially inward extending teeth which are meshingly engaged by the second transfer gear 112, in the same manner as in the first embodiment described above. The output member 116 also includes a tubular sleeve 119 with an internal bore 120 for receiving a rotatable driven shaft 122 therein.

In this embodiment, a housing 124 is provided in the form of a cover having a hollow internal cavity 126. A bore 128 extends through a side wall of the housing 124 and receives the tubular sleeve 119 of the output member 116 therethrough. The housing 124 is fixedly secured to the end bell 102 by suitable means, such as by high frequency welding. In this mounting position, as shown in FIG. 8, the housing 124 surrounds the second transfer gear 112 and the output member 116 and retains such components in rotatable engagement as described above.

The operation of the embodiment shown in FIGS. 7-10 is the same as that described above and shown in FIGS. 1-6 with the second transfer gear 112 eccentrically driven about the first gear 108 and simultaneously nutates within the third gear 118, to bring one tooth of the third gear 118 into alignment with one tooth of the first gear 108 during each predetermined amount of rotation of the second transfer gear 112. This provides the desired gear reduction depending upon the number of teeth in the first and third gears 108 and 118 and the tooth difference between the first and third gears 108 and 118, as described above.

Figure 11:
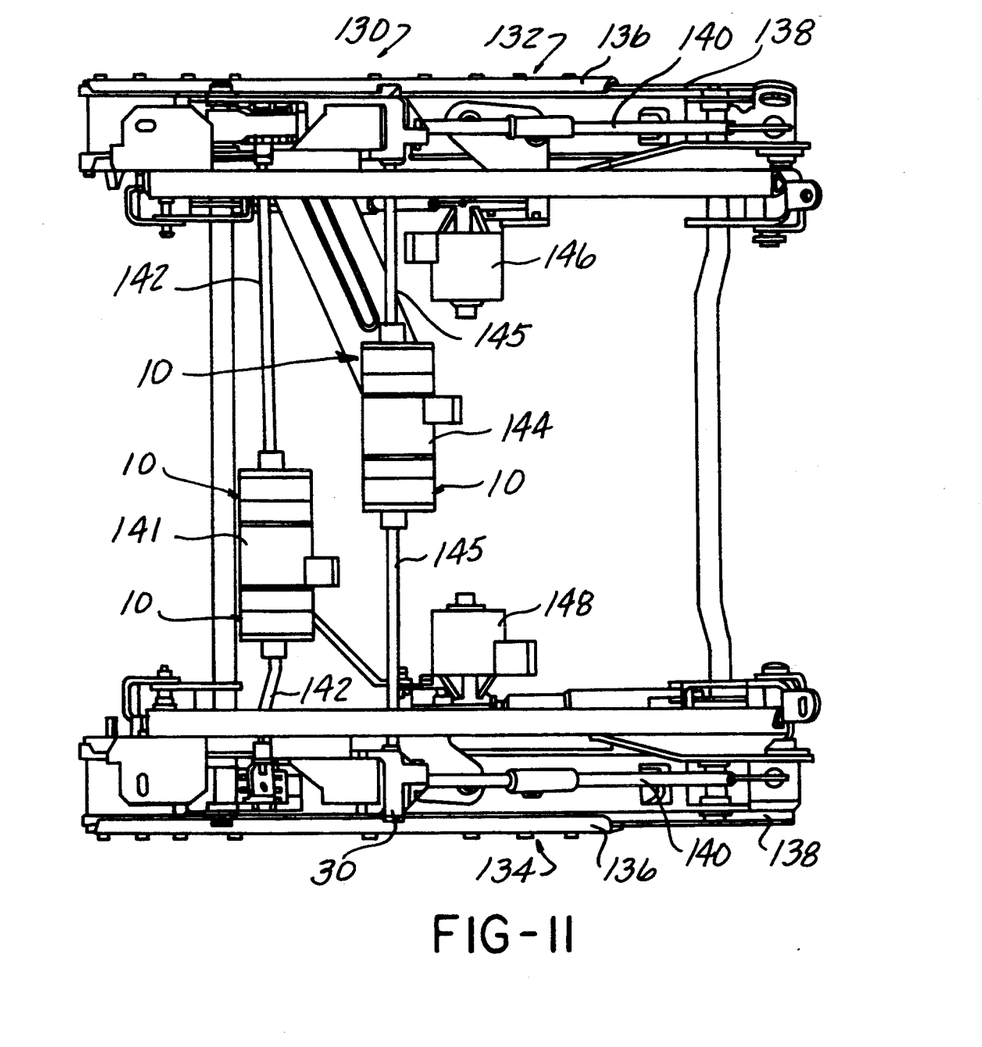
FIG. 11 is a plan view of a vehicle power seat adjuster employing the first embodiment of the gear reducer of the present invention.

Either embodiment of the gear reducer 10 or 100 described above may be advantageously employed in a power seat adjuster 130, shown in FIG. 11, to substantially reduce the noise associated with the rotatable shafts employed in such a power seat adjuster. By way of example only, the power seat adjuster 130 is a so-called "eight-way" adjuster providing horizontal fore-/aft, vertical up and down movement of separate front and rear portions of the adjuster, as well as pivotal tilting of the seat back with respect to the seat bottom of a vehicle seat mounted on the seat adjuster 130. It will be understood that the gear reducer 10 or 100 of the present invention may also be employable with a power seat adjuster which includes only at least a horizontal fore and aft movement.

As is conventional, the power seat adjuster 130 includes a pair of spaced, longitudinally extending track assemblies 132 and 134. Each of the track assemblies 132 and 134 includes a lower track 136 which is securely anchored to the floor of a vehicle. An upper track 138 is slidably disposed within each lower track 136. A drive means, such as a lead screw 140, is mounted above each upper track 138 and is operably coupled thereto by means of a conventional ball nut to horizontally drive the upper track 138 in opposed fore and aft directions with respect to the associated lower track 136. A horizontal bi-directional electric motor 141 is mounted on the power seat adjuster 130 by means of suitable brackets, not shown. A pair of rotatable output shafts 142 are provided on opposite sides of the horizontal drive motor 141. Gear reducers 10 as described above, are mounted on opposite ends of the horizontal drive motor 140 and rotate the output shafts 142. The rotatable output shafts 142 are connected to a gear box associated with the lead screw 140 on each track assembly 132 and 134 for bi-directionally rotating the lead screw 140. It will be understood that the second embodiment of the gear reducer 100 may also be employed on the horizontal drive motor 140.

Similarly, gear reducers 10 or 100 may be mounted on opposite ends of a seat recliner drive motor 144 which is centrally located between the track assemblies 132 and 134 and drive shafts 145 connected by suitable linkages to the seat back recliner mechanism of a conventional power seat adjuster. Although not shown, either of the gear reducers 10 or 100 may also be mounted on or integrally formed with the vertical drive motors 146 and 148 which adjust the front and rear height of the seat adjuster 130.

By employing the gear reducer 10 or 100 on each of the drive motors 140, 144, 146 or 148 of the power seat adjuster 130, the high speed rotation of the motor output shafts are reduced to a lower speed rotation of the rotatable drive shafts 142 or 145 thereby significantly reducing vibration and the resulting noise associated with rotation of such shafts, particularly if such shafts are of a flexible nature as shown for the drive shaft 142. In addition, the use of the gear reducer 10 or 100 of the present invention also simplifies the gear box or transmission coupling the rotatable drive shafts 142 or 144 to the lead screws 140 or connecting the drive shafts 145 to vertical adjust linkages of the power seat adjuster 130. This minimizes space at a congested area above the upper track of each track assembly and thereby simplifies the construction of such track assemblies. This results in a lower cost power seat adjuster which also has the significant advantage of reduced noise for quieter operation. Further, the sliding contact between the gear teeth of the gears in the gear reducer 10 and 100 generate a high amount of friction which prevents any back-drive of the gear reducer 10 or 100. Various optional components, such as seat position memory devices or right angle output drives may also be easily connected to the gear reducer 10 or 100 of the present invention. Finally, two gear reducers 10 or 100 may be coupled together by an intermediate shaft to provide additional gear reduction.

In summary, there has been disclosed a unique gear reducer which reduces the speed of rotation of a driven shaft to a lower amount from a higher speed rotation of a drive shaft. The gear reducer of the present invention is advantageously employed in a vehicle power seat adjuster and reduces the noise normally associated with high speed rotation of drive shafts employed to re-position the various components of the seat adjuster in adjusting the horizontal, vertical or seat back recliner positions of a vehicle seat mounted on the power seat adjuster.

What is claimed is:

1. A gear reducer comprising:
   a first non-rotatable gear;
   a second transfer gear meshingly engageable with the first gear, the second transfer gear being formed of a resilient material;
   means for eccentrically driving the second transfer gear in meshing engagement with the first gear;
   a third gear rotatably mounted with respect to the first gear and the second transfer gear, the second transfer gear nutatingly engaging the third gear and moving a tooth of the third gear into alignment with one tooth of the first gear for each predetermined amount of rotation of the second transfer gear;
   output shaft connection means formed on the third gear; and
   the first and third gears having substantially the same pitch circle diameter and each having a plurality of gear teeth formed thereon, the third gear having a predetermined different number of teeth than the number of teeth on the first gear to provide a predetermined gear reduction between the first and third gears.

2. The gear reducer of claim 1 further comprising:
   a housing;
   a first diameter bore formed in the housing;
   the first gear integrally formed in the housing internally within the first diameter bore;
   a second diameter bore formed in the housing adjacent to and communicating with the first diameter bore;
   an output member freely rotatably mounted in the second diameter bore in the housing and having first and second opposed ends;
   a bore formed in and extending from the first end of the output member, the third gear being formed internally in the bore in the output member; and
   the output shaft connecting means formed in the second end of the output member and extending outward from the housing.

3. The gear reducer of claim 1 wherein there is a one tooth difference between the number of teeth on the third gear and the number of teeth on the first gear.

4. The gear reducer of claim 1 wherein there is a two tooth difference between the number of teeth on the third gear and the number of teeth on the first gear.

5. The gear reducer of claim 1 wherein the eccentrically driving means comprises:
   a collar having a first bore eccentrically located with respect to the axis of rotation of the collar, the bore in the collar receiving a rotatable drive shaft therein, the collar mounted in a running fit within a bore in the second transfer gear.

6. The gear reducer of claim 1 wherein the teeth of each of the first, second and third gears have a sinusoidal shape.

7. The gear reducer of claim 1 further comprising:
   an end bell mounted on a drive motor and having a through bore receiving a drive shaft of a drive motor;
   the first gear integrally formed on the end bell and having a plurality of radially inward extending gear teeth;
   a housing having a hollow interior cavity and a through bore extending through one side wall, the housing fixedly connected to the end bell and surrounding the first, second and third gears; and
   the output shaft connecting means on the third gear rotatably extending through the bore in the side wall of the housing.

8. The gear reducer of claim 7 wherein the eccentrically driving means comprises:
   a collar having a first bore eccentrically located with respect to the axis of rotation of the collar, the bore in the collar receiving a rotatable drive shaft therein, the collar mounted in a running fit within a bore in the second transfer gear.

9. The gear reducer of claim 1 wherein the eccentrically driving means comprises:
   a collar having an elliptical shape, and a first bore eccentrically located with respect to a longitudinal axis of the collar, the bore receiving a rotatable drive shaft therein;

the collar mounted in a running fit within a bore formed in the second transfer gear and deforming the second transfer gear to an elliptical shape.

10. A power seat adjuster for a vehicle seat having gear reduction means for reducing the speed of rotation of a rotatable shaft, the power seat adjuster comprising:

a pair of track assemblies mounted in spaced relationship on a vehicle floor and supporting a vehicle seat thereon, each track assembly including:
a lower track anchored to a vehicle floor;
an upper track slidably mounted in the lower track;
an electric drive motor mounted to at least one of the track assemblies and having at least one rotatable output shaft;
a drive shaft connected to the output shaft of the drive motor;
drive means, engaging the upper track and driven by the drive shaft, for moving the upper track with respect to the lower track upon rotation of the output shaft of the drive motor; and
gear reduction means, coupled to and between the output shaft of the drive motor and the drive shaft, for reducing the speed of rotation of the output shaft of the drive motor, the gear reduction means including:
a first non-rotable gear;
a second transfer gear meshingly engageable with the first gear, the second transfer gear being formed of a resilient material;
means for eccentrically driving the second transfer gear in meshing engagement with the first gear;
a third gear rotatably mounted with respect to the first gear and the second transfer gear, the second transfer gear nutatingly engaging the third gear and moving a tooth of the third gear into alignment with one tooth of the first gear for each predetermined amount of rotation of the second transfer gear;
output shaft connection means formed on the third gear; and
the first and third gears having substantially the same pitch circle diameter and each having a plurality of gear teeth formed thereon, the third gear having a predetermined different number of teeth than the number of teeth on the first gear to provide a predetermined gear reduction between the first and third gears.

11. The power seat adjuster of claim 10 further comprising:
a housing;
a first diameter bore formed in the housing;
the first gear integrally formed in the housing internally within the first diameter bore;
a second diameter bore formed in the housing adjacent to and communicating with the first diameter bore;
an output member freely rotatably mounted in the second diameter bore in the housing and having first and second opposed ends;
a bore formed in the and extending from first end of the output member, the third gear being formed internally in the bore in the output member; and
the output shaft connecting means formed in the second end of the output member and extending outward from the housing.

12. The power seat adjuster of claim 10 wherein there is a one tooth difference between the number of teeth on the third gear and number of teeth on the first gear.

13. The power seat adjuster of claim 10 wherein there is a two tooth difference between the number of teeth on the third gear and the number of teeth on the first gear.

14. The power seat adjuster of claim 10 wherein the eccentrically driving means comprises:
a rotatable coupler shaft; and
a collar having a first bore eccentrically located with respect to the axis of rotation of the collar, the coupler shaft mounted in the bore in the collar and connected to the output shaft of the drive motor, the collar mounted in a running fit within a bore in the second transfer gear.

15. The power seat adjuster of claim 10 wherein the teeth of each of the first, second and third gears have a sinusoidal shape.

16. The power seat adjuster of claim 10 further comprising:
an end bell mounted on a drive motor and having a through bore receiving the drive shaft of the drive motor;
the first gear integrally formed on the end bell and having a plurality of radially inward extending gear teeth;
a housing having a hollow interior cavity and a through bore extending through one side wall, the housing fixedly connected to the end bell and surrounding the first, second and third gears; and
the output shaft connecting means on the third gear rotatably extending through the bore in the side wall of the housing.

17. The power seat adjuster of claim 16 wherein the eccentrically driving means comprises:
a rotatable coupler shaft; and
a collar having a first bore eccentrically located with respect to the axis of rotation of the collar, the coupler shaft mounted in the bore in the collar and connected to the output shaft of the drive motor, the collar mounted in a running fit within a bore in the second transfer gear.

* * * * *

UNITED STATES PATENT AND TRADEMARK OFFICE
CERTIFICATE OF CORRECTION

PATENT NO. : 5,398,904
DATED : March 21, 1995
INVENTOR(S) : Richard W.A. Rees

It is certified that error appears in the above-indentified patent and that said Letters Patent is hereby corrected as shown below:

Column 11, line 12, delete "a" (second occurrence) and insert --the--.

Column 11, line 28, delete "non-rotable" and insert --non-rotatable--.

Signed and Sealed this

Twenty-sixth Day of September, 1995

Attest:

BRUCE LEHMAN

*Attesting Officer*         *Commissioner of Patents and Trademarks*